Aug. 24, 1926.

J. T. KEENAN

GLASS FURNACE

Filed July 7, 1924

1,597,073

Inventor
J. T. Keenan
By
Attorney

Patented Aug. 24, 1926.

1,597,073

UNITED STATES PATENT OFFICE.

JAMES T. KEENAN, OF PARKERSBURG, WEST VIRGINIA.

GLASS FURNACE.

Application filed July 7, 1924. Serial No. 724,628.

This invention relates to glass melting furnaces and more particularly to improved means for delivering molten glass from the furnace tank or other reservoir.

Many difficulties have heretofore surrounded the feeding of flowing molten glass from the furnace because of the high temperature at which the material must be kept to maintain the required plasticity, and likewise, due to the extremely viscous nature of the molten glass, the material adheres to the feeding instrumentalities unless they are kept cool, and in that case the glass is liable to become chilled. This chilled portion of the glass must then be chipped from the feeding implements, and, although it may be fed back to the furnace and remelted, it greatly decreases the operating efficiency of the system, especially when dealing with translucent glass compounds. Again, the ladling processes heretofore in use are expensive, requiring excessive cost of production of the glass or similar material manufactured. Attempts may have also been made to feed the molten glass by displacement thereof in the tank, as for instance pneumatically or by a series of surges, but such methods have been found to be impractical and inefficient, especially with large working capacities.

The main object of my invention, then, is to provide an improved mechanism for elevating and flowing a quantity of molten glass from the furnace tank to the casting table or blowing machine, pressing machines or the like without the use of dipping ladles or devices similar in character.

A further object is to provide an accelerating feeding action of the molten glass and one that is quickly and easily controllable, both as to its manner of operation and as to the quantity of glass fed by a single operator.

Another object is the provision of a feeding device of the above described character that effects delivery of the molten glass in a comparatively pure state and without defects, such as bubbles, seeds, and the like which occur with the use of dipping ladles.

A further object is to provide a feeding device for molten glass in which a surplus amount of the molten material is returned to the tank by gravity.

The invention accordingly consists in the provision of a small furnace in front of the main furnace or tank and in communication therewith by means of a bridge wall and a relatively constricted throat. The auxiliary furnace is provided with one or more plungers adapted to be mechanically reciprocated and upon being reciprocated into the molten glass acts to displace the same, causing it to rise and overflow through an opening in the auxiliary tank above the level of the ordinary molten glass and to be dropped or fed to the casting table or blowing machine as desired.

Other objects of the invention than those stated above, together with the advantages inherent therein, will be in part obvious and in part specifically referred to in the course of the following description of the various elements, arrangement of parts, combinations thereof, and application of the principles constituting the invention and the scope of invention contemplated will appear from the following claims.

In the accompanying drawings, which are to be taken as part of the disclosure, and in which I have shown a preferred form of embodiment of my invention—

Figure 1:
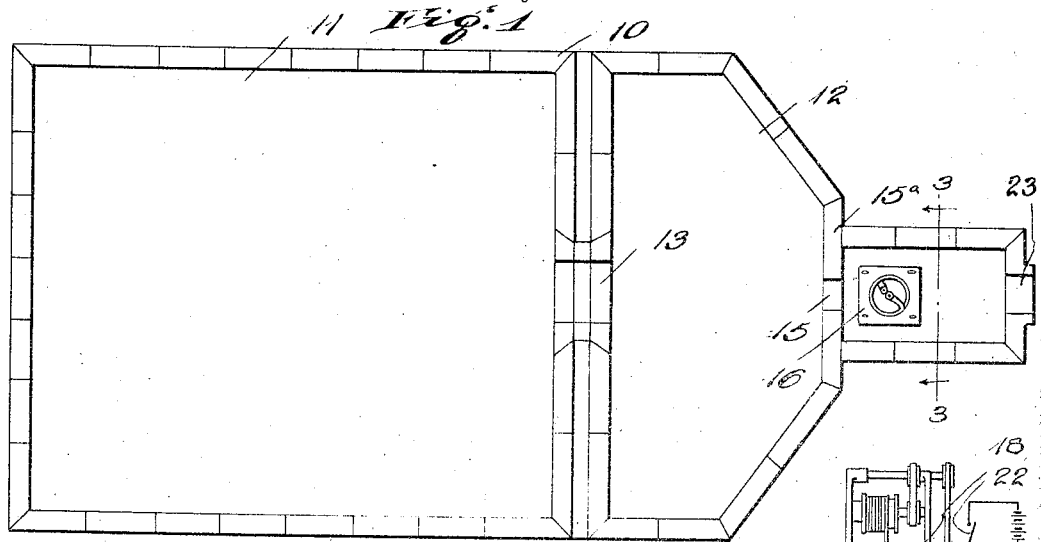
Figure 1 is a semi-diagrammatic plan view of the furnace and feeding device therefor.
Figure 2:
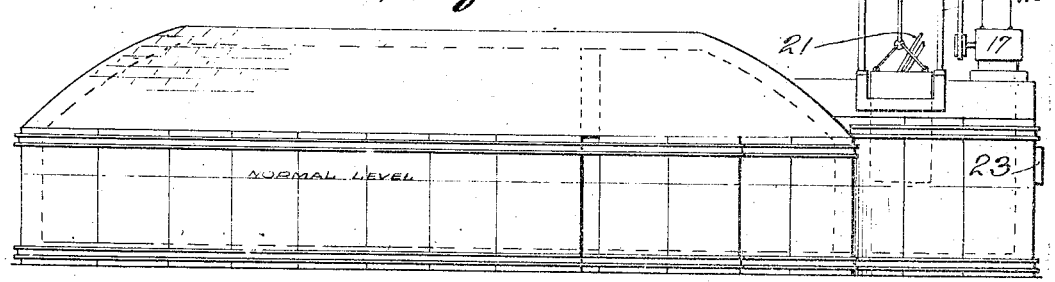
Figure 2 is a side elevation showing the auxiliary tank and reciprocating plunger.

Referring to the drawings, and more particularly Figure 1, the numeral 10 indicates a main furnace comprising the melting chamber 11, which is heated by any suitable means, and a refining chamber 12. These are in communication with each other through the opening 13, the parts so far described being customary in furnaces of this type.

Positioned at the front of the refining chamber 12 is an auxiliary or feeding chamber 14 in communication with the refining chamber 12 through a restricted aperture or throat 15 in the bridge wall 15ª. The molten glass flows from the heating chamber 11 to the refining chamber 12, thence through the throat 15 to the feed chamber 14, the normal level in the three tanks being maintained as nearly constant as possible.

Figure 4:
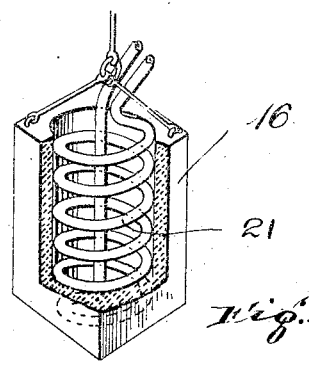
Figure 4 is a detail embodying the plunger and cooling means therefor.

The auxiliary or feed chamber 15 has mounted thereon one or more plungers displacers 16 adapted to be reciprocated therein and actuated mechanically as through a reversible motor 17 and pulley drive 18 operating in the frame-work 20, although a hydraulic pump or compressed air or a rack and pinion drive might be used for this plunger actuating means without departing from the scope of the invention. The plunger is preferably of refractory material and is hollow inside (see Figure 4) and adapted to be cooled with water as through a cooling coil, as shown at 21. Control means for the motor 12 are indicated as by a switch 22, by which one may vary the depth that the plunger is forced down into the glass, which in turn determines the quantity of the material fed.

Figure 3:
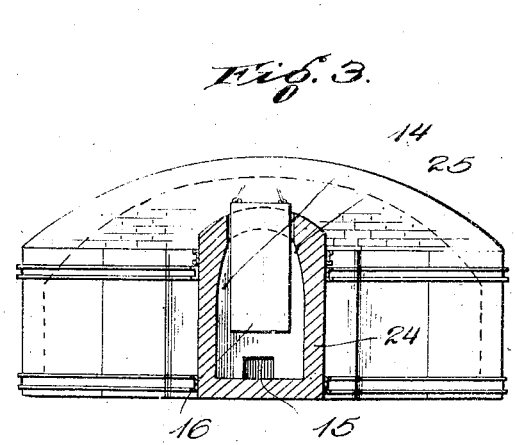
Figure 3 is a detail in section, on the line 3—3 of Figure 1, with certain parts removed, showing the construction of the auxiliary tank.

It will be evident that as the plunger is reciprocated and moves up and down into the molten glass in the feeding chamber 14 that a quantity of the molten glass will be displaced, due to viscosity of the material and the constricted throat 15 which prevents the displacement being taken up instantly in the main furnace and a quantity of the material in the feed tank will be elevated above the height of a discharge opening 23 in the front wall of the auxiliary tank 14, and be fed therethrough as desired. As shown in Figure 3, the top walls 24 of the feeding tank 14 may be sloped, as at 25, thereby to hasten and accelerate the elevation of the molten glass to and through the discharge outlet 23 of the feed tank 14, due to the decrease in the surface area of the glass in the feeding tank available to the displacement of the molten glass. The discharge opening 23, being positioned higher than the normal level of the glass in the tank, permits any surplus amount of the elevated glass to fall back by gravity into the tank.

From the above, it is evident that by the herein described apparatus, molten glass may be flown from the furnace at will and such discharge will not fill the outlet with chilled glass which, of course, would cause an interruption in the manufacture of the sheet glass or bottles, tumblers and the like. It is likewise seen that the molten glass, not coming in contact with metal ladles or other devices for delivering the glass from the furnace to the casting table or machine, will be free from blisters, seeds, bubbles, etc., and when in its finished state will be free from the resulting imperfections. By the use of a refractory plunger which may be cooled either by air or water a hardened glass film will form on the outer surface thereof to which the molten glass will not adhere and this feature adds greatly to the efficiency and practical nature of the device. Likewise it is evident that the control of the feeding of the molten glass may be taken care of by one man operating the motor or other means to reciprocate the plunger instead of the numerous helpers required in, for instance, the ladling operation of feeding the molten glass. The amount of molten glass fed may be easily controlled and determined according to the depth to which the plunger is forced into the auxiliary feeding furnace and molten glass therein.

The above described feeding apparatus is available for any amount of the molten glass desired to be fed to the casting table or machine, but it is especially applicable for feeding the glass in large quantities, as for instance, in the manufacture of the sheet glass, where it is necessary to deliver molten glass to the amount of approximately 500 pounds or greater to the casting table.

Inasmuch as many changes could be made in the above construction and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all embodiments within the scope of the invention which, as a matter of fact, may be said to fall therebetween.

I claim:—

1. In apparatus of the class described, in combination, a glass melting tank and a communicating refining tank, an auxiliary tank in communication with the refining tank and having a discharge opening above the normal glass level therein, a displacer of refractory material, said displacer being hollow and having therein a cooling coil adapted to cool said displacer, and means to reciprocate said displacer in said auxiliary tank to displace the molten glass above its normal level therein and thereby discharge the same through said discharge outlet.

2. In an apparatus of the class described, the combination of a main furnace comprising a glass melting tank and a refining tank, an auxiliary feed tank in communication therewith having a discharge opening above the normal glass level therein, a displacer, means to reciprocate said displacer in said auxiliary tank to thereby displace the molten glass therein and cause it to discharge through said discharge outlet, the walls of said auxiliary tank being sloped inwardly above the normal level of the molten glass thereby to effect an accelerated displacement of the glass upon reciprocation of said displacer.

3. In apparatus of the class described, in combination, a tank, having a discharge opening above the normal glass level therein, a displacer of refractory material, and means to reciprocate said displacer in said tank to displace the molten glass above its normal level therein and thereby discharge the same through said discharge outlet, the walls of said tank being sloped inwardly above the normal level of the molten glass thereby to effect an accelerated displacement action.

4. In apparatus of the class described, in combination, a glass melting tank and a communicating refining tank, an auxiliary tank in communication with the refining tank and having a discharge opening above the normal glass level therein, a displacer of refractory material, means to cool said displacer, and means to reciprocate said displacer in said auxiliary tank to displace the molten glass above its normal level therein and thereby discharge the same through said discharge outlet, the walls of said auxiliary tank being sloped inwardly above the normal level of the molten glass thereby to effect an accelerated displacement action.

Signed at Parkersburg, W. Va., this 30th day of June, 1924.

JAMES T. KEENAN.